April 28, 1959 C. R. DOTY ET AL 2,884,064

AUTOMATIC ERROR CORRECTING DEVICE

Filed June 29, 1955 2 Sheets-Sheet 1

INVENTORS
CHARLES R. DOTY
ROY J. SMITH
BY [signature]
ATTORNEY

INVENTORS
CHARLES R. DOTY
ROY J. SMITH
BY James W. Fitzsimmons
ATTORNEY

United States Patent Office 2,884,064
Patented Apr. 28, 1959

2,884,064

AUTOMATIC ERROR CORRECTING DEVICE

Charles R. Doty, Poughkeepsie, and Roy J. Smith, Wappingers Falls, N.Y., assignors to International Business Machines Corporation, New York, N.Y., a corporation of New York Application June 29, 1955, Serial No. 518,796

16 Claims. (Cl. 164—113)

Figure 1:
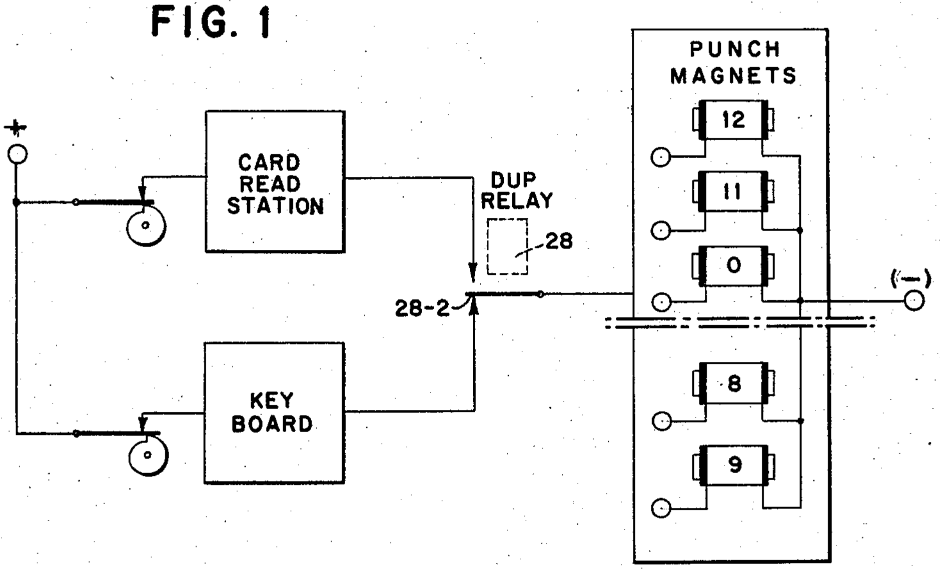

This invention relates to a statistical card punching machine and more particularly an improved device for automatically duplicating in a second card, correct information from a first card containing correct information followed by an error.

In the conventional use of a statistical card punch of the type shown in U.S. Patent No. 2,647,581, a keyboard is used to energize punch magnets at a card punch station. (This is known as a keying operation.) The sequence of operation is such that upon energization of punch magnets (storage), an escapement operation takes place advancing the next succeeding card column of the card at the punch station into punching position whereupon the information stored in the punch magnets is punched into the card.

For convenience in control of the punching station, the card is considered as being subdivided into fields, with each field having a predetermined information assignment. For example, field 1 would contain a name; field 2 an address; field 3 a city and then successive fields would contain statistical information; such as part #. quantity, color, etc. The field subdivision is determined by a program card, as described in the aforementioned Patent 2,647,581, which program card is punched to control the actuation of electrical switches that condition circuits corresponding to the field being punched. For example, one electrical circuit might be conditioned for operation by a star wheel sensing a hole in the fourth row (four hole) of a column of the program card.

A primary object of this invention is to provide a device for automatically duplicating only the correct fields of a card if an error is punched in that card, after several fields have been properly punched (error card). That is, by depressing an error control button on the keyboard, all the correct fields are automatically duplicated in a new card without manually re-keying it.

In the above mentioned patent, 2,647,581, a card read station and a card punch station are shown, and the operation of the punch station in response to information either in the card at the read station or under control of a keyboard is described. Circuitry is also described for duplicating information from one card to another by manually closing a duplicate switch, while the operator visually checks the error card as it advances through the card read station. Just before the error card reaches its error column, the operator opens the duplicate switch, and then manually keys the remainder of the statistical information. Such an operation requires the operator's individual attention, and it is possible for her to make an error in the duplication by failing to stop on time, and thereby duplicate the error information. Accordingly, it is a further object of this invention to provide an improved automatic duplicating process for a statistical card punch, by which only preselected information is punched or duplicated from the error card into a new card.

A specific advantage of this automatic duplicator is that it permits the operator to perform some other operation while an error card is being duplicated. For example, if the card punch were being operated concurrently with the manipulation of a typewriter keyboard (as is well known in the art), then during card error duplication the typist can correct the corresponding typewritten form.

A still further object of this invention is to provide a device for duplicating an error card which might contain information duplicated from a previous error card when an error is keyed after correct duplication has taken place.

Further objects and advantages of this invention will be pointed out in the following description and claims and illustrated in the accompanying drawings, which disclose, by way of example, the principle of the invention and the best mode, which has been contemplated, of applying that principle.

Figure 2:
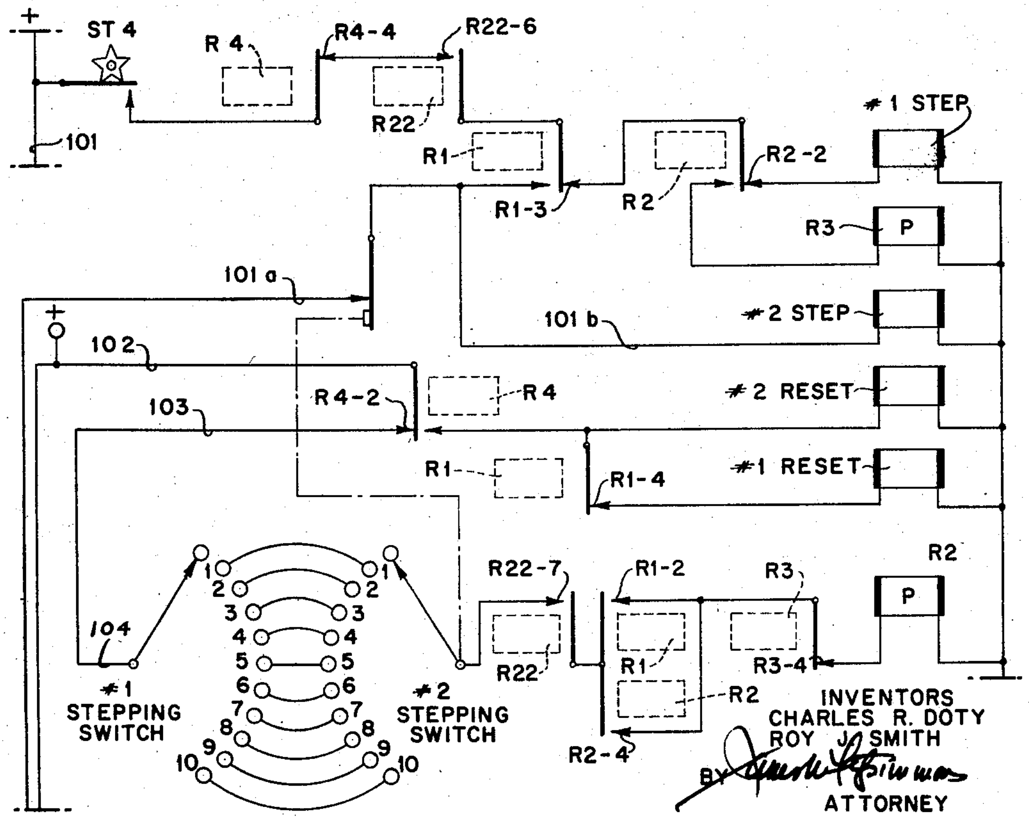
Figure 2A:
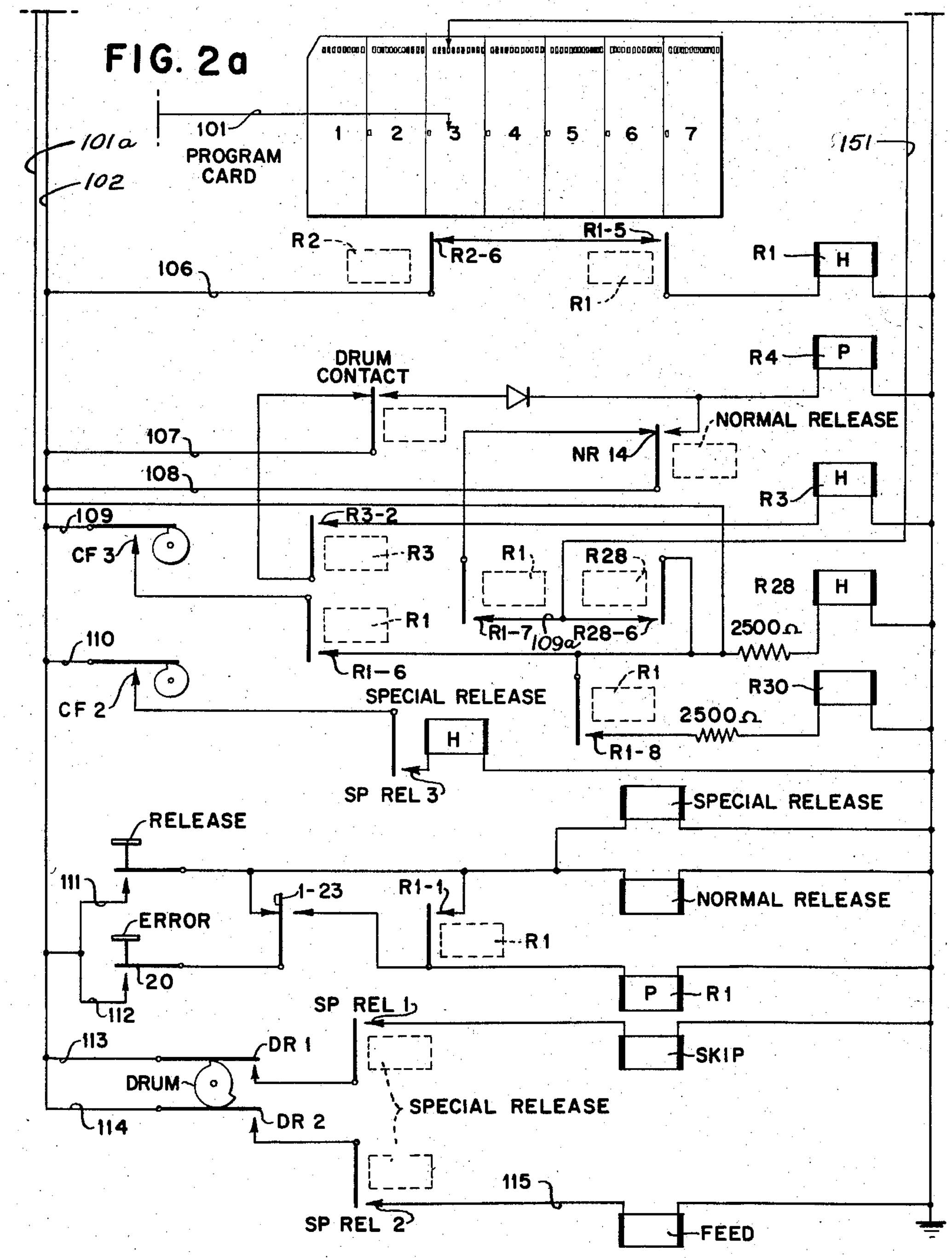

In the drawings:

Fig. 1 is a schematic circuit indicating that the card punch station of a statistical card punch is selectively under control of either the card read station, or a manual keyboard; while Figs. 2 and 2*a* combined form a schematic wiring diagram of the circuitry for operating the automatic duplicating device.

This invention relates to an IBM card punch of the type shown in U.S. Patent 2,647,581, which is provided with additional circuitry whereby a first stepping switch is impulsed every time a field of a card has been correctly punched. If an error is punched in a card after one or more fields have been correctly punched, then by closing an error switch, the error card will be advanced to a card read station to act as a storage device for the duplication of its correct fields into a new card at the card punch station. The duplication process advances a second stepping switch step by step as each correct field is duplicated until the two stepping switches are in coincidence, whereupon the duplication process will be terminated, and the remainder of the statistical information is manually keyed into the second card. If an error is punched in the second card after the automatic duplication process, and while it is being manually keyed, then the second card is used as a storage device for the duplication of its correct fields into a third card, which process can be continued until a correct card is punched.

As a basis for the following description, let it be assumed that a card is in the punch station and a card is in the read station of a statistical card punch, such as described in U.S. Patent 2,647,581, with the card in the read station at column 1 and the card in the punch station at column 0. The card at the punch station is then punched (keyed) column by column, under control of the manual keyboard.

In a keying operation, depression of any key on the keyboard sets up interposers at the card punch station, and the operation of the interposers, in turn, sequentially causes an escapement cycle (advancing the cards in read station and punch station one column) and then the punching of the stored information into the card column that is advanced into punching position. This process is continued through the keying of field one, or until a skip key is hit, which, as described in aforesaid U.S. Patent 2,647,581, causes both the card in the read station to be advanced until column one of the second field is at the read line, and the card at the punch station to be advanced until the column before the first column of field two is in punching registration (punch line). If an error is punched in the first field, it cannot be corrected automatically, and instead the first field must be manually re-keyed.

As described in U.S. Patent 2,647,581, a program drum, having a program card thereon, is stepped in coincidence with the card column at the card read station. A star wheel sensing device is provided for reading punched holes in the program card, with the sensing wheel acting to close electrical switches as a hole is read in its assigned card row.

In the illustrated embodiment, one of the star wheel contacts—the one assigned to read row four (four hole)—closes an electrical switch (ST–4) each time the first column of a new card field is advanced to the card read line (the program card is punched so that it contains a four-hole in the first column of each card field, except for the first column of field one). The electrical switch ST–4 (in line 101, Fig. 2), each time it is closed, conditions a circuit to pulse the number one stepping relay (#1 step) thereby advancing stepping switch # 1 (line 104) one position.

Actually the circuit in line 101 is from "+" through star wheel switch ST–4, via R4–4 normally closed, through R22–6 normally open, but closed as described in next paragraph; through R1–3 normally closed; through R2–2 normally closed, and through the #1 stepping relay (#1 step) to ground, thereby pulsing the #1 stepping switch and advancing it one position. This advance of the stepping switch is intended to represent that all of the previous card field has been satisfactorily punched (in the instance field #1).

Relay R22–6 is an escape interlock relay and it is in the stepping relay circuit as a safety feature to prevent pulsing the stepping relay until the first character in the succeeding field (in the instance, field two) is called for by the keyboard. As the keyboard energizes one of the punch interposers at the card punch station, thereby initiating a card column escape cycle, R–22 is energized completing the circuit to the #1 stepping relay.

The R4–4 contact point, as later described, is a contact point on a card release relay.

After column one of the second field has been advanced to the card read line, the machine remains at rest until the operator resumes the keying operation. The operation of the keyboard (as above described), indirectly causes the pulsing of the #1 stepping relay, and simultaneously causes the selected holes to be punched in column one of field two at the card punch stations. The keying operation is then selectively continued through all of field two until the operator either hits a skip key to advance the card into the first column of field three, or advances it to field three in punching and escapement cycles. In either event, when the first column of card field three reaches the read station, the star wheel ST–4 will again sense a number four hole (in first column of field three) to send another pulse to the #1 stepping relay: i.e. after R22–6 is closed by the first keyboard operation of field three. The pulsing of the #1 stepping relay advances the #1 stepping switch from number one position to number two position, to represent thereby that all of field one and all of field two have been satisfactorily completed.

The operator continues keying through field three, until she hits the skip key, or until she normally escapes into the first column of field four, whereupon, as above described, the #1 stepping switch will be conditioned for advancement to number three position (upon first keyboard stroke) representing thereby that field three was satisfactorily punched.

Let it be assumed that in field four the operator makes an error. Assume this error is noted immediately, or at any time before the first character is next field (fifth field) is punched. As heretofore described, the escapement interlock relay 22–6 is held open until the operator keys the first character of the next field, consequently, the #1 stepping switch after being advanced to the number three position will remain in that position all through the error field (fourth) and until the first card punch cycle of the succeeding (or fifth) field.

Upon noting the error, the operator hits the error key (line 112) to close the contact 20 which closes a circuit to the common of the contact 1–23. This contact is under control of #1 stepping switch, and is transferred as long as the #1 stepping switch is in other than its zero position. Consequently, after the first column of field two has been advanced to the read station (and the #1 stepping relay is pulsed), then the #1 stepping switch transfers all #1 contacts. Consequently, the pulse from contacts 20 (line 112) will pick up a relay R1–P (pick) which closes the point R1–5 (line 106) thereby establishing a hold circuit through R2–6 normally closed and through R1–5 normally open, now closed, to the hold winding whereupon R1 will be held up until the R2–6 contact is opened (which as later described, takes place when the No. 2 stepping switch is advanced to coincidence with the No. 1 stepping switch). The contacts 20 (line 112) of the error key also provide a parallel circuit through the contact R1–1 normally open, now closed, to a Normal Release relay (line 111) and Special Release relay (line 111). This Normal Release relay, when energized, conditions circuits (not shown, but described in U.S. Patent 2,647,581) for advancing a card from column eighty at the punch station to a point where column one of the same card is at the read station. Simultaneously, a new card is fed to a point where its zero column is registered at the punch station.

When the zero column of the new card is registered at the punch station, then the CF–3 cam (line 109) (as described in Gardiner Patent 2,647,581) is closed to send a pulse through R1–6 contact point normally open, now closed, to pick up duplicate relay 28. A parallel hold circuit is established through 28–6 (off line 109) normally open, now closed, through R1–7 normally open, now closed through contact normal Rel–14 normally closed, to the positive side of the line (line 108). It will be remembered that the R1–7 point is picked up by the error key, and will hold up until we have coincidence between the first and second stepping switches.

The release point NR 14 is normally closed, but as soon as the Normal Release relay is energized to start a release operation (i.e. to advance a card from punch station to read station) it is transferred to its normally open side and its stays there until column 81½ of the card at punch station is registered with the punch line, then drops out again and restores to its normally closed side. Consequently, the release contact NR 14 will be in its normally closed position (as shown in Fig. 2) by the time the zero column of a new card is in registration with the card punch station, when CF–3 closes.

With reference to Fig. 1, it will be noted that when the duplicate relay 28 is energized, the card punch magnets are under control of the card read station, instead of the manual keyboard.

When the duplicate relay 28 is energized, and after a release operation, the information in the first field of the error card will be duplicated into the new card at the punch station. In the Gardiner Patent 2,647,581, this circuit is described, as is another circuit (blank column) for advancing each card into the first column of the next succeeding field after the punching in one field has been completed. More specifically, in parallel with the duplicate relay 28 another contact point (off line 109) R1–8 normally open, now closed is provided which energizes (a blank column) relay 30. This relay 30, when energized, conditions the card punch to skip over the blank columns in the remainder of any field until the card at the read station is advanced so that column one of the next succeeding field is at the read station, and the zero column of the next field of the other card is at the punch station.

*Automatic error correction*

In the operation of the automatic duplicator, the theory is to pulse the #2 stepping switch relay as each correct field is duplicated, and continue duplication of all fields until the positions of the two stepping switches (line 104) are in coincidence, and then return the machine to control of the keyboard for manual keying.

To accomplish this result, a circuit is provided (line 101a) through a normally closed contact point of step switch #2 to energize the #2 stepping relay (#2 step) to advance the associated switch from the zero to the one position as soon as the duplicate relay 28 is energized. As the No. 2 stepping switch reaches its No. 1 position the normally closed point in line 101a is mechanically opened so that the #2 step relay receives only a single stepping pulse through line 101a.

Point R1–3 in line 101 is transferred to its normally open side when R1 (line 112) is energized as a result of closing error key 20. Then #2 stepping relay (instead of #1) is under the control of the No. 4 hole in the program card. However, there is no #4 hole in program card until first column of field two, consequently, the stepping switch No. 2 will not be advanced to the second position until the first column of the second field is punched in duplication. That is, a pulse will pass through the star wheel ST–4 and through R4–4 (normally closed) and through R22–6 (when the first escapement takes place under duplication) and then, the pulse will pass through the normally open R1–3 point, now closed, to the No. 2 stepping relay thereby advancing No. 2 stepping switch to the second position. So too will it be advanced to the three position as the first column of the third field is punched. Therefore, the second stepping switch will be in its No. three position when the first column of the third field is duplicated. It will be remembered that the No. 1 stepping switch had been stopped in the third position and now the No. 2 stepping switch is in the third position, but before the No. 2 stepping switch got to the third position, the duplicate relay 28 which was still up, started duplication of the third field, and once duplication is started, the program card controls duplication through the remainder of the field. For example, #12 holes are punched right across the program card, except for the first column of each field. The #12 holes condition circuits through star wheel switches via line 151 to continue duplication once the duplicate relay has started duplicating a field.

Under the facts presented, duplication will take place through all of field three but, since coincidence of the two stepping switches has taken place, a pulse is available through R4–2, normally closed (line 102), to the No. 1 stepping switch; through the No. 1 stepping switch contact point 3 (line 104) through contact point 3 of No. 2 stepping switch to R22–7 normally open, now closed (under control of escape relay as described for R22–6, line 101) to R1–2 normally open, now closed; through R3–4 normally closed to the R2 relay. When R2 is picked up, it will be noted that the R2–6 contact point normally closed (line 106) is now opened, thereby dropping out the R1 hold coil so that all the R1 points will drop out. Then R2 holds through R2–4 normally open, now closed. Also, R2–2 (line 101) will transfer to connect R3 to line 101. Accordingly, R1–7 opens (line 109a) thereby permitting R–28 to drop out as soon as program card runs out of #12 holes in any associated field. Also, R1–3 (line 101) will return to its normally closed position since R1 has dropped out, thereby providing a circuit to R–3 (off line 101).

Duplicating through the third field will continue until the new card reaches a position wherein the first column of field four is one column out of the punch station. In the meantime the first column of field four of the error card is now at the read station. Then after the next escapement cycle (which must be under control of manual keyboard since the duplicate relay 28 is open) a pulse is available from the fourth hole in program card to energize the R3 pick relay (since R2–2 is transferred).

R3 has a hold coil which is energized through (line 107) the normally closed drum contact, through R3–2 normally open now closed. R3 hold will remain energized until the card in the punch station reaches column eighty-one, at which column the drum contact (line 107) will open to drop out R3.

The fourth card field (of the new card) now can be punched under control of the manual keyboard, and if the fourth field is correctly punched, the card can be advanced until the first column of the next or fifth field is in alignment with the card read station and the corresponding column of the card to be punched is just one column short of the punch station.

As the first column of field four is manually punched, the pulse from the star wheel contact ST–4 is available through R2–2 normally open, now closed, to energize R3, as above described, instead of stepping relay #1, since it is already in a position indicating that three fields have been correctly punched.

When R3 is up—and it will be up until the end of the card being punched—R2 (line 104) can no longer be energized (since R3–4 is open), hence #1 stepping relay is reconnected to the star wheel contact ST–4 (line 101). Accordingly, if field four is correctly punched, then when the first column of field five is punched, a pulse is available through (line 101) the star wheel contact ST–4; R4–4 normally closed; R22–6 normally open, now closed; R1–3 normally closed (since R1-hold dropped out (line 106) as soon as R2–6 opened as a result of coincidence between stepping switches #1 and #2); through R2–2 normally closed to pulse the #1 stepping relay to advance stepping switch #1 to the fourth position.

This sequence of operation will continue through the remainder of the card until either the error key or the release key is closed.

If the card is punched without error, then the card can be released, and as the card passes through column eighty to column eight-one (which operation is described in U.S. Patent 2,647,581) the drum contact (line 107) is transferred to pick the R4 relay. When the R4 relay is picked, the R4–2 contact (line 102) is changed from its normally closed to its normally open side thereby pulsing the reset for both #2 and #1 stepping switches to restore them to their zero positions respectively.

However, if during the manual punching of the new card, another error is made (after correct fields had been duplicated in it), then when the operator hits the error key again, R1 will be energized as heretofore described before releasing the card. Consequently, the R1–4 contact (off line 102a) point will be opened to break the circuit to #1 reset, and accordingly, during card release the #2 stepping switch will be reset, but not the #1 stepping switch. Therefore, for example, if instead of making another error in field four, the operator makes an error in field seven, after fields four, five and six have been satisfactorily punched, then the error card at the punch station will have six correct fields, and an error in the seventh field. The error key causes the last named error card to be advanced to the card read station, whereupon six fields will then be duplicated in a second new card at the punch station, before manual keyboard control is restored.

In normal operation of a card punch of the type described in U.S. Patent 2,647,581, a card is automatically released after column 80 has been punched. Consequently, if an error occurs in the last column, the card would be released before the error key could be struck. The same situation exists if the card is programmed so that column 75 or any other column is the last column punched. With the automatic release of such a card, both stepping switches would be reset, as previously described, and consequently, all the storage would be lost. In order to compensate for this condition, the machine is changed from automatic release to manual release. Accordingly, a card release (after last column has been punched) will not take place unless you hit either the error key, if an error, or the release key, if a correctly punched card.

More specifically, the drum contact (lines 113, 114) (which is connected to the program drum shaft) is set to close the contacts DR1 and DR2 at column 80½ and keep them closed for an interval long enough to register column zero of a new card at the punch line and column one of the punched card at the read line.

On this basis, a card would be released as soon as column eighty was punched (and the #1 and #2 stepping switches would be automatically reset). In order to prevent this automatic reset, a pair of normally open contact points (SP Rel 1 and 2) are placed respectively in the circuits to the Skip relay and the Feed relay. The Special Release relay which controls the closing of these SP contacts is energized for every good card, or error card, and the cards in the punch station and read station cannot be released until the special release contact points are closed. They are closed in the following manner.

With the card stopped, after complete punching, or after an error has been noted, it is necessary to hit either the Release key (line 111) or the Error key (line 112), and it will be noted that if the Release key is closed, a circuit is available to pick up simultaneously, the Normal Release relay and the Special Release relay.

The Special Release relay is held in by circuit (line 110) that is energized by CF2 cam which is closed during substantially all of a card cycle as described in U.S. Patent 2,647,581. The Special Release relay closes the Special Release contacts 1 and 2, thereby pulsing both the Skip and the Feed relays (lines 113, 114) when the drum contact closes DR1 and DR2. If the Error key is closed, on the other hand, (*a*) before field #1 has been satisfactorily punched, the Release relay and Special Release relay will be picked through contact 1–23 normally closed, to permit the release of the card; and the resetting of both stepping switches; or (*b*) after the stepping switch passes its first point (i.e. after first field punched) then the contact point 1–23 will be transferred to its normally open point so that when the Error key is closed a pulse will go through 1–23 normally open, now closed, to pick the R1 relay which, as heretofore described, starts duplication, but R1 also opens the circuit off line 102, thereby preventing energization of the #1 stepping switch Reset relay. Accordingly, the #2 stepping switch will be reset, but the #1 stepping switch will indicate the number of correctly punched fields in the card at the punch station.

While there have been shown and described and pointed out the fundamental novel features of the invention as applied to a preferred embodiment, it will be understood that various omissions and substitutions and changes in the form and details of the device illustrated and in its operation may be made by those skilled in the art without departing from the spirit of the invention. It is the intention therefore, to be limited only as indicated by the scope of the following claims.

What is claimed is:

1. In a statistical card punching machine having, in combination, a card read station, a card punch station, duplicate control means having a normal position wherein said card punch station is operable under control of an external conditioning source and a transferred position wherein information in a card at said read station is duplicated in a card at said punch station, and circuit controlled mechanism for advancing a card from said punch station to said read station while a new card is advanced to said punch station, a device for automatically duplicating correct information from an error card to a new card at said card punch station after said error card has been advanced from the punch station to the read station comprising an impulsing switch, means conditioning the same to emit an impulse each time a predetermined column of a card being punched is in alignment with a reference position, a first counting means operable under control of said impulsing switch when said duplicate control means is in its normal position, an error key having circuitry controlled thereby for transferring said duplicate control means to its transferred position, a second counting means operable under control of said impulsing switch when said duplicate control means is in its transferred position, and circuit means operable when said counting means reach coincidence for restoring said duplicate control means to its normal position.

2. In a statistical card punching machine having, in combination, a card read station, a card punch station, circuit controlled mechanism for advancing a card from said punch station to said read station while a new card is advanced to said punch station, a card escape circuit for advancing cards simultaneously column by column through said card read station and said card punch station, and a duplicate switch having a normal position wherein said card punch station operates under control of a manual conditioning source and a transferred position wherein said card punch station operates under control of a card at said card read station, a device for automatically duplicating correct information from an error card to a new card at said card punch station after said error card has been advanced from the punch station to the read station comprising a program drum having a program card movable column by column in coincidence with the card at the card read station, an impulsing switch, said program card being operative to condition said impulsing switch each time a predetermined column of a card is at the card read station, a first stepping switch including circuitry for pulsing the same in increments under control of said program card operated impulsing switch when said duplicating switch is in its normal position, an error release key having means controlled thereby for transferring said duplicate switch to its transferred position, a second stepping switch including circuitry for pulsing the same in increments under control of said card operated impulsing switch when said duplicate switch is in its transferred position, circuit means operable when said stepping switches reach coincidence for restoring said duplicate switch to its normal position, a normal release key for releasing a satisfactorily completed card from said punch station, and means under control of said normal release key for resetting said stepping switches to their zero positions.

3. In a statistical card punching machine having, in combination, a card read station, a card punch station, circuit controlled mechanism for advancing a card from said punch station to said read station while a new card is advanced to said punch station, a card escape circuit for advancing cards simultaneously column by column through said card read station and said card punch station, and a duplicate switch having a normal position wherein said card punch station operates under control of a manual conditioning source and a transferred position wherein said card punch station operates under control of a card at said card read station, a device for automatically duplicating correct information from an error card to a new card at said card punch station after said error card has been advanced from the punch station to the read station comprising an impulsing switch, means conditioning the same each time a predetermined column of a card field is at the card read station, a first stepping switch including circuitry for pulsing the same in increments under control of said impulsing switch when said duplicating switch is in its normal position, an error release key having means controlled thereby for transferring said duplicating switch to its transferred position, a second stepping switch including circuitry for pulsing the same in increments under control of said impulsing switch when said duplicate switch is in its transferred position, circuit means operable when said stepping switches reach coincidence for restoring said duplicate switch to its normal position, a circuit for resetting both of said stepping switches, and means under control of said error release key for interrupting the circuit to the first stepping switch reset whereby when said error release key is operated only the second stepping switch is reset by said reset circuit.

4. In a statistical card punching machine having, in combination, a card read station, a card punch station, circuit controlled mechanism for advancing a card from said punch station to said read station while a new card is advanced to said punch station, a card escape circuit for advancing cards simultaneously column by column through said card read station and said card punch station, and a duplicate switch having a normal position wherein said card punch station is operable under control of a manual conditioning source and a transferred position wherein said card punch station is operable under control of a card at said card read station, a device for automatically duplicating correct information from an error card to a new card at said card punch station after said error card has been advanced to the read station comprising a program drum having a card movable column by column in coincidence with the card at the card read station, said program card being operable to condition an impulsing switch each time a predetermined column of a card field is at the card read station, a first stepping switch including circuitry for pulsing the same in increments under control of said program card operated impulsing switch when said duplicating switch is in its normal position, an error release key having means controlled thereby for transferring said duplicate switch to its transferred position, a second stepping switch including circuitry for pulsing the same in increments under control of said card operated impulsing switch when said duplicate switch is in its transferred position, circuit means operable when said stepping switches reach coincidence for restoring said duplicate switch to its normal position, a circuit for resetting both of said stepping switches and means responsive to operation of said error release key for resetting the second stepping switch while interrupting the circuit to the reset of the first stepping switch provided the first stepping switch has been advanced from its zero position.

5. In a statistical card punching machine having, in combination, a card read station, a card punch station, circuit controlled mechanism for advancing a card from said punch station to said read station while a new card is advanced to said punch station, a card escape circuit for advancing cards simultaneously column by column through said card read station and said card punch station, and a duplicate switch having a normal position wherein said card punch station operates under control of a manual conditioning source and a transferred position wherein said card punch station operates under control of a card at said card read station, a device for automatically duplicating correct information from an error card to a new card at said card punch station after said error card has been advanced from the punch station to the read station comprising an impulsing switch, means conditioning the same each time a predetermined column of a card field is at the card read station, a first stepping switch including circuitry for pulsing the same in increments under control of said impulsing switch when said duplicating switch is in its normal position, an error release key having means controlled thereby for transferring said duplicate switch to its transferred position, a second stepping switch including circuitry for pulsing the same in increments under control of said impulsing switch when said duplicate switch is in its transferred position, circuit means operable when said stepping switches reach coincidence for restoring said duplicate switch to its normal position, a circuit for resetting both of said stepping switches, means responsive to operation of said error release key for resetting the second stepping switch while interrupting the circuit to the reset of the first stepping switch, and means operable under control of said first stepping switch for interrupting the disabling operation of said first stepping switch reset under control of said error release key until said first stepping switch has been pulsed at least once.

6. In a statistical card punching machine having, in combination, a card read station, a card punch station, circuit controlled mechanism for advancing a card from said punch station to said read station while a new card is advanced to said punch station, a card escape circuit for advancing cards simultaneously column by column through said card read station and said card punch station, and a duplicate switch having a normal position wherein said card punch station operates under control of a manual conditioning source and a transferred position wherein said card punch station operates under control of a card at said card read station, a device for automatically duplicating correct information from an error card to a new card at said card punch station after said error card has been advanced to the read station comprising an impulsing switch, means conditioning the same each time a predetermined column of a card field is at the card read station, a first stepping switch including circuitry for pulsing the same in increments under control of said impulsing switch when said duplicating switch is in its normal position, an error release key having means controlled thereby for transferring said duplicate switch to its transferred position, a second stepping switch including circuitry for pulsing the same in increments under control of said card operated impulsing switch when said duplicate switch is in its transferred position, and circuit means operable when said stepping switches reach coincidence for restoring said duplicate switch to its normal position, said first stepping switch having normally open contacts which are closed after said first stepping switch has been advanced from its zero position, and means acting through said normally open contacts of said first stepping switch for preventing duplication if said error release key is operated before at least one card field has been satisfactorily completed.

7. In a statistical card punching machine having, in combination, a card read station, a card punch station, circuit controlled mechanism for advancing a card from said punch station to said read station while a new card is advanced to said punch station, a card escape circuit for advancing cards simultaneously column by column through said card read station and said card punch station, and a duplicate switch having a normal position wherein said card punch station operates under control of a manual conditioning source and a transferred position wherein said card punch station operates under control of a card at said read station, a device for automatically duplicating correct information from an error card to a new card at said card punch station after said error card has been advanced from the punch station to the read station comprising a program card movable column by column in coincidence with the card at the card read station, said program card being operative to condition an impulsing switch each time a predetermined column of a card is at the card read station, a first stepping switch including circuitry for pulsing the same in increments under control of said program card operated impulsing switch when said duplicating switch is in its normal position, an error release key having means controlled thereby for transferring said duplicate switch to its transferred position, a second stepping switch including circuitry for pulsing the same in increments under control of said card operated impulsing switch when said duplicate switch is in its transferred position, and circuit means operable when said stepping switches reach coincidence for restoring said duplicate switch to its normal position, a circuit for resetting both of said stepping switches, means under control of said error release key for interrupting the circuit to the first stepping switch reset device whereby when said error release key is operated only the second stepping switch is reset by said reset circuit, said first stepping switch having normally open contacts which are closed after said first stepping switch has been advanced from its zero position, and means acting through said normally open contacts of said first stepping switch for preventing duplication if said error release key is operated before at least one card field has been satisfactorily completed.

8. In a statistical card punching machine having, in combination, a card read station, a card punch station, circuit controlled mechanism for advancing a card from said punch station to said read station while a new card is advanced to said punch station, a card escape circuit for advancing cards simultaneously column by column through said card read station and said card punch station, and a duplicate switch having a normal position wherein said card punch station operates under control of a manual conditioning source and a transferred position wherein said card punch station operates under control of a card at said card read station, a device for automatically duplicating correct information from an error card to a new card at said card punch station after said error card has been advanced to the read station comprising a program drum having a program card movable column by column in coincidence with the card at the card read station, said program card being operable to condition an impulsing switch each time a predetermined column of a card field is at the card read station, a first stepping switch including circuitry for pulsing the same in increments under control of said program card operated impulsing switch when said duplicating switch is in its normal position, an error release key having means controlled thereby for transferring said duplicate switch to its transferred position, a second stepping switch including circuitry for pulsing the same in increments under control of said card operated impulsing switch when said duplicate switch is in its transferred position, circuit means operable when said stepping switches reach coincidence for restoring said duplicate switch to its normal position, and means under control of said program card for continuing duplication through the remainder of a card field even though said stepping switches have reached coincidence.

9. In a statistical card punching machine having, in combination, a card read station, a card punch station, circuit controlled mechanism for advancing a card from said punch station to said read station while a new card is advanced to said punch station, a card escape circuit for advancing cards simultaneously column by column through said card read station and said card punch station, and a duplicate switch having a normal position wherein said card punch station operates under control of a manual conditioning source and a transferred position wherein said card punch station operates under control of a card at said card read station, a device for automatically duplicating correct information from an error card to a new card at said card punch station after said error card has been advanced to the read station comprising a program drum having a program card movable column by column in coincidence with the card at the card read station, said program card being operable to condition an impulsing switch each time a predetermined column of a card field is at the card read station, a first stepping switch including circuitry for pulsing the same in increments under control of said program card operated impulsing switch when said duplicating switch is in its normal position, an error release key having means controlled thereby for transferring said duplicate switch to its transferred position a second stepping switch including circuitry for pulsing the same in increments under control of said operated impulsing switch when said duplicate switch is in its transferred position, circuit means operable when said stepping switches reach coincidence for restoring said duplicate switch to its normal position, said circuit for pulsing said stepping switches having means therein for interrupting the pulse to a stepping switch until the first column of a card field at the punch station is conditioned to be punched.

10. In a statistical card punching machine having, in combination, a card read station, a card punch station, circuit controlled mechanism for advancing a card from said punch station to said read station while a new card is advanced to said punch station, a card escape circuit for advancing cards simultaneously column by column through said card read station and said card punch station, and a duplicate switch having a normal position wherein said card punch station operates under control of a manual conditioning source and a transferred position wherein said card punch station operates under control of a card at said card read station, a device for automatically duplicating correct information from an error card to a new card at said card punch station after said error card has been advanced to the read station comprising an impulsing switch, means conditioning the same each time a predetermined column of a card field is at the card read station, a first stepping switch including circuitry for pulsing the same in increments under control of said impulsing switch when said duplicating switch is in its normal position, an error release key having means controlled thereby for transferring said duplicate switch to its transferred position, a second stepping switch including circuitry for pulsing the same in increments under control of said impulsing switch when said duplicate switch is in its transferred position, circuit means operable when said stepping switches reach coincidence for restoring said duplicate switch to its normal position, a normal release key for releasing a satisfactorily completed card from said punch station, means under control of said normal release key for resetting said stepping switches to their zero positions, said first stepping switch having normally open contacts which are closed after said first stepping switch has been advanced from its zero position, and means acting through said normally open contacts of said first stepping switch for preventing duplication if said error release key is operated before at least one card field has been satisfactorily completed.

11. In a statistical card punching machine having, in combination, a card read station, a card punch station, circuit controlled mechanism for advancing a card from said punch station to said read station while a new card is advanced to said punch station, a card escape circuit for advancing cards simultaneously column by column through said card read station and said card punch station, and a duplicate switch having a normal position wherein said card punch station operates under control of a manual conditioning source and a transferred position wherein said card punch station operates under control of a card at said card read station, a device for automatically duplicating correct information from an error card to a new card at said card punch station after said error card has been advanced to the read station comprising a program drum having a program card movable column by column in coincidence with the card at the card read station, said program card being operative to condition an impulsing switch each time a predetermined column of a card field is at the card read station, a first stepping switch including circuitry for pulsing the same in increments under control of said program card operated impulsing switch when said duplicating switch is in its normal position, an error release key having means controlled thereby for transferring said duplicate switch to its transferred position, a second stepping switch including circuitry for pulsing the same in increments under control of said card operated impulsing switch when said duplicate switch is in its transferred position, circuit means operable when said stepping switches reach coincidence for restoring said duplicate switch to its normal position, a normal release key for releasing a satisfactorily completed card from said punch station, means under control of said normal release key for resetting said stepping switches to their zero positions, and means under control of said program card for continuing duplication through the remainder of a card field even though said stepping switches have reached coincidence.

12. In a statistical card punching machine having, in combination, a card read station, a card punch station, circuit controlled mechanism for advancing a card from said punch station to said read station while a new card is advanced to said punch station, a card escape circuit for advancing cards simultaneously column by column through said card read station and said card punch station, and a duplicate switch having a normal position wherein said card punch station operates under control of a manual conditioning source and a transferred position wherein said card punch station operates under control of a card at said card read station, a device for automatically duplicating correct information from an error card to a new card at said card punch station after said error card has been advanced to the read station comprising a program drum having a program card movable column by column in coincidence with the card at the card read station, said program card being operative to condition an impulsing switch each time a predetermined column of a card field is at the card read station, a first stepping switch including circuitry for pulsing the same in increments under control of said program card operated impulsing switch when said duplicating switch is in its normal position, an error release key having means controlled thereby for transferring said duplicate switch to its transferred position, a second stepping switch including circuitry for pulsing the same in increments under control of said card operated impulsing switch when said duplicate switch is in its transferred position, and circuit means operable when said stepping switches reach coincidence for restoring said duplicate switch to its normal position, a normal release key for releasing a satisfactorily completed card from said punch station, and means under control of said normal release key for resetting said stepping switches to their zero positions, said circuit for pulsing said stepping switches having means therein for interrupting the pulse to a stepping switch until the first column of a card field is conditioned to be punched.

13. In a statistical card punching machine having, in combination, a card read station, a card punch station, circuit controlled mechanism for advancing a card from said punch station to said read station while a new card is advanced to said punch station, a card escape circuit for advancing cards simultaneously column by column through said card read station and said card punch station, and a duplicate switch having a normal position wherein said card punch station operates under control of a manual conditioning source and a transferred position wherein said card punch station operates under control of a card at said card read station, a device for automatically duplicating correct information from an error card to a new card at said card punch station after said error card has been advanced to the read station comprising a program drum having a program card movable column by column in coincidence with the card at the card read station, said program card being operative to condition an impulsing switch each time a predetermined column of a card field is at the card read station, a first stepping switch including circuitry for pulsing the same in increments under control of said program card operated impulsing switch when said duplicating switch is in its normal position, an error release key having means controlled thereby for transferring said duplicate switch to its transferred position, a second stepping switch including circuitry for pulsing the same in increments under control of said card operated impulsing switch when said duplicate switch is in its transferred position, circuit means operable when said stepping switches reach coincidence for restoring said duplicate switch to its normal position, a normal release key for releasing a satisfactorily completed card from said punch station, means under control of said normal release key for resetting said stepping switches to their zero positions, said circuit for pulsing said stepping switches having means therein for interrupting the pulse to a stepping switch until the first column of the corresponding card field is conditioned to be punched, and means under control of said program card for continuing duplication through the remainder of a card field even though said stepping switches have reached coincidence.

14. In a statistical card punching machine having, in combination, a card read station, a card punch station, circuit controlled mechanism for advancing a card from said punch station to said read station while a new card is advanced to said punch station, a card escape circuit for advancing cards simultaneously column by column through said card read station and said card punch station, and a duplicate switch having a normal position wherein said card punch station operates under control of a manual conditioning source and a transferred position wherein said card punch station operates under control of a card at said card read station, a device for automatically duplicating correct information from an error card to a new card at said card punch station after said error card has been advanced to the read station comprising a program drum having a program card movable column by column in coincidence with the card at the card read station, said program card being operable to condition an impulsing switch each time a predetermined column of a card field is at the card read station, a first stepping switch including circuitry for pulsing the same in increments under control of said program card operated impulsing switch when said duplicating switch is in its normal position, an error release key having means controlled thereby for transferring said duplicate switch to its transferred position, a second stepping switch including circuitry for pulsing the same in increments under control of said card operated impulsing switch when said duplicate switch is in its transferred position, circuit means operable when said stepping switches reach coincidence for restoring said duplicate switch to its normal position, a circuit for resetting both of said stepping switches, means under control of said error release key for interrupting the circuit to the first stepping switch reset device whereby when said error release key is operated only the second stepping switch is reset by said reset circuit, said first stepping switch having normally open contacts which are closed after said first stepping switch has been advanced from its zero position, means acting through said normally open contacts of said first stepping switch for preventing duplication if said error release key is operated before at least one card field has been satisfactorily completed, and means under control of said program card for continuing duplication through the remainder of a card field even though said stepping switches have reached coincidence.

15. In a statistical card punching machine having, in combination, a card read station, a card punch station, circuit controlled mechanism for advancing a card from said punch station to said read station while a new card is advanced to said punch station, a card escape circuit for advancing cards simultaneously column by column through said card read station and said card punch station, and a duplicate switch having a normal position wherein said card punch station operates under control of a manual conditioning source and a transferred position wherein said card punch station operates under control of a card at said card read station, a device for automatically duplicating correct information from an error card to a new card at said card punch station after said error card has been advanced to the read station comprising a program drum having a program card movable column by column in coincidence with the card at the card read station, said program card being operable to condition an impulsing switch each time a predetermined column of a card field is at the card read station, a first stepping switch including circuitry for pulsing the same in increments under control of said program card operated impulsing switch when said duplicating switch is in its normal position, an error release key having means controlled thereby for transferring said duplicate switch to its transferred position, a second stepping switch including circuitry for pulsing the same in increments under control of said card operated impulsing switch when said duplicate switch is in its transferred position, circuit means operable when said stepping switches reach coincidence for restoring said duplicate switch to its normal position, a circuit for resetting both of said stepping switches, means under control of said error release key for interrupting the circuit to the first stepping switch reset device whereby when said error release key is operated only the second stepping switch is reset by said reset circuit, said first stepping switch having normally open contacts which are closed after said first stepping switch has been advanced from its zero position, means acting through said normally open contacts of said first stepping switch for preventing duplication if said error release key is operated before at least one card field has been satisfactorily completed, said circuit for pulsing said stepping switches having means therein for interrupting the pulse to a stepping switch until the first column of the corresponding card field is conditioned to be punched, and means under control of said program card for continuing duplication through the remainder of a card field even though said stepping switches have reached coincidence.

16. In a statistical card punching machine having, in combination, a card read station, a card punch station, circuit controlled mechanism for advancing a card from said punch station to said read station while a new card is advanced to said punch station, a card escape circuit for advancing cards simultaneously column by column through said card read station and said card punch station, and a duplicate switch having a normal position wherein said card punch station operates under control of a manual conditioning source and a transferred position wherein said card punch station operates under control of a card at said card read station, a device for automatically duplicating correct information from an error card to a new card at said card punch station after said error card has been advanced from the punch to the read station comprising an impulsing switch, means conditioning the same each time a predetermined column of a card is at the card read station, a first stepping switch including circuitry for pulsing the same in increments under control of said impulsing switch when said duplicating switch is in its normal position, an error release key having means controlled thereby for transferring said duplicate switch to its transferred position, a second stepping switch including circuitry for pulsing the same in increments under control of said impulsing switch when said duplicate switch is in its transferred position, and circuit means operable when said stepping switches reach coincidence for restoring said duplicate switch to its normal position.

No references cited.